United States Patent
Hollmann et al.

(10) Patent No.: US 12,455,356 B2
(45) Date of Patent: Oct. 28, 2025

(54) CONVOLVED AUGMENTED RANGE LIDAR NOMINAL AREA

(71) Applicant: The Charles Stark Draper Laboratory, Inc., Cambridge, MA (US)

(72) Inventors: Joseph Hollmann, Watertown, MA (US); Zachary R. Hoffman, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 18/428,827

(22) Filed: Jan. 31, 2024

(65) Prior Publication Data

US 2024/0168138 A1    May 23, 2024

Related U.S. Application Data

(63) Continuation of application No. 16/415,933, filed on May 17, 2019, now Pat. No. 11,921,238.

(60) Provisional application No. 62/675,281, filed on May 23, 2018, provisional application No. 62/673,196, filed on May 18, 2018.

(51) Int. Cl.
| | |
|---|---|
| *G01S 7/4865* | (2020.01) |
| *G01S 17/10* | (2020.01) |
| *G05D 1/00* | (2024.01) |
| *G05D 1/249* | (2024.01) |

(52) U.S. Cl.
CPC ........... *G01S 7/4865* (2013.01); *G01S 17/10* (2013.01); *G05D 1/0231* (2013.01); *G05D 1/249* (2024.01)

(58) Field of Classification Search
CPC .................................................. G01S 7/4865
See application file for complete search history.

(56) References Cited

U.S. PATENT DOCUMENTS

| | | | |
|---|---|---|---|
| 8,010,309 B2 * | 8/2011 | Lundstedt | G01N 35/00871 702/104 |
| 8,581,172 B2 | 11/2013 | Eldesouki et al. | |
| 9,383,753 B1 * | 7/2016 | Templeton | G05D 1/0246 |
| 9,634,156 B2 | 4/2017 | Pavlov et al. | |

(Continued)

FOREIGN PATENT DOCUMENTS

| | | | |
|---|---|---|---|
| CA | 2241897 A1 * | 7/1997 | |
| JP | 2007527145 A | 9/2007 | |

OTHER PUBLICATIONS

Hardesty, "Depth-sensing imaging system can peer through fog", MIT News, 3 pages, Mar. 20, 2018.

Carter et al., "Lidar 101: An Introduction to Lidar Technology, Data, and Applications", National Oceanic and Atmospheric Administration (NOAA) Coastal Services Center, 76 pages, Nov. 1, 2012.

(Continued)

*Primary Examiner* — Jean Paul Cass
(74) *Attorney, Agent, or Firm* — BROOKS KUSHMAN P.C.

(57) ABSTRACT

A method of lidar imaging pulses a scene with laser pulse sequences from a laser light source. Reflected light from the scene is measured for each laser pulse to form a sequence of time resolved light signals. Adjoining time bins in the time resolved light signals are combined to form super time bins. A three dimensional image of the scene is created from distances determined based on maximum intensity super time bins. One or more objects are located within the image. For each object, the time resolved light signals are combined to form a single object time resolved light signal from which to determine distance to the object.

12 Claims, 6 Drawing Sheets

(56) References Cited

U.S. PATENT DOCUMENTS

| | | | |
|---|---|---|---|
| 11,112,361 B2* | 9/2021 | Rothberg | H10F 39/014 |
| 11,127,116 B2 | 9/2021 | Takahasi et al. | |
| 11,276,148 B2 | 3/2022 | Talbert et al. | |
| 11,280,737 B2 | 3/2022 | Talbert et al. | |
| 11,288,772 B2 | 3/2022 | Talbert et al. | |
| 11,827,337 B2* | 11/2023 | Inokuchi | G01P 5/26 |
| 11,981,445 B2* | 5/2024 | Overfield | B60L 50/66 |
| 2009/0046289 A1* | 2/2009 | Caldwell | G01P 13/025 |
| | | | 356/341 |
| 2010/0195100 A9* | 8/2010 | Caldwell | G01S 17/87 |
| | | | 356/341 |
| 2017/0052065 A1 | 2/2017 | Sharma et al. | |
| 2018/0284247 A1* | 10/2018 | Campbell | G01S 17/10 |
| 2018/0284276 A1* | 10/2018 | Campbell | G01S 7/4817 |
| 2018/0284277 A1* | 10/2018 | LaChapelle | G01S 17/89 |
| 2018/0284278 A1* | 10/2018 | Russell | G01S 17/89 |
| 2018/0284279 A1* | 10/2018 | Campbell | G01S 7/4817 |
| 2018/0284286 A1* | 10/2018 | Eichenholz | G01S 17/89 |
| 2019/0327124 A1* | 10/2019 | Lai | G01S 5/017 |
| 2019/0353792 A1 | 11/2019 | Hollmann et al. | |
| 2020/0333295 A1 | 10/2020 | Schiffres et al. | |
| 2020/0402209 A1 | 12/2020 | Talbert et al. | |
| 2021/0025824 A1* | 1/2021 | Rothberg | H10F 39/026 |
| 2024/0168138 A1* | 5/2024 | Hollmann | G01S 7/4876 |

OTHER PUBLICATIONS

Takagi et al., "Road Environment Recognition Using On-Vehicle LIDAR", IEEE Intelligent Vehicles Symposium, 9 pages, Jan. 1, 2006.

Hata et al., "Feature Detection for Vehicle Localization in Urban Environments Using a Multilayer LIDAR", Journal of Latex Class Files, vol. 11, No. 4, Dec. 1, 2012.

Agishev et al., "Lidar with SiPM: Some capabilities and limitations in real environment", Optics & Laser Technology, vol. 49, pp. 86-90, Jan. 23, 2013.

Edgar et al., "Real-Time computational photon-counting LiDAR" Optical Engineering, vol. 57(3), pp. 031304-1-7, Dec. 29, 2017.

Hermosilla et al., "Evaluation of Automatic Building Detection Approaches Combining High Resolution Images and LIDAR Data", Remote Sens., 2011, vol. 3, pp. 1188-1210.

Uhrig et al., "Sparsity Invariant CNNs", Sep. 1, 2007, 16 pages.

Hartling et al., "Urban Tree Species Classification Using a WorldView-2/3 and LiDAR Data Fusion Apprach and Deep Learning", 2019, 54 pages.

Yue et al., "LiDAR Data Enrichment Using Deep Learning Based on High-Resolution Image: An Approach to Achieve High-Performance LiDAR SLAM Using Low-cost LiDAR", 7 pages.

Chen et al., "Accuracy Improvement of Imaging Lidar Based on Time-Correlated Single-Photon Counting Using Three Laser Beams", Optics Communications, 2018, Vo. 429, pp. 175-179.

* cited by examiner

CONVOLVED AUGMENTED RANGE LIDAR NOMINAL AREA

CROSS-REFERENCE TO RELATED APPLICATIONS

This patent application is a Continuation of U.S. patent application Ser. No. 16/415,933 filed May 17, 2019, which claims the benefit of U.S. Provisional Patent Application No. 62/673,196, filed May 18, 2018 and U.S. Provisional Patent Application No. 62/675,281, filed May 23, 2018. This application is related to U.S. patent application Ser. No. 16/415,748, filed on May 17, 2019. The disclosures of all these applications are incorporated by reference herein in their entirety.

TECHNICAL FIELD

The present invention relates to relates to range detection systems, and more particularly to light detection and ranging (lidar) systems.

BACKGROUND ART

The demand for lidar imaging solutions has increased with the advent of autonomous vehicles and drones. Lidar uses a pulsed laser beam to probe the distance to a reflector by measuring the time it takes for the light to be reflected back to the device. This allows for very precise measurements of a given environment. However, the small wavelength of light means that rain drops, fog, smoke, sand, and other scatterers can obscure the signal. These scatterers act to reflect light back to the lidar sensor and result in false distance measurements. Some work has been done with time-gating the lidar signal to remove returns from nearby scatterers but the benefits have been limited.

SUMMARY

Embodiments of the present invention are directed to lidar imaging that pulses a scene with laser pulse sequences from a laser light source. Reflected light from the scene is measured for each laser pulse in the sequence to form a sequence of time resolved light signals. When a minimum number of photons per time bins fails to occur, then one or more adjoining time bins in a time resolved light signal are summed together to form super time bins. In each signal, a maximum peak is located and the associated time of flight is averaged for the signals obtained at each scan location. A three dimensional image of the scene is created from the distances associated with the average times of flight at each location, and one or more objects are located within the image. For each object, corresponding original time resolved signals are summed to form a single object time resolved signal from which to determine distance to the object.

In addition, measuring the reflected light also may include detrending or high-pass filtering the time resolved light signals to offset scattering effects in the measured reflected light. Measuring the reflected light may include adaptively filtering the time resolved light signals to offset scattering effects in the measured reflected light, for example, using a Kalman filter, and/or adaptively adjusting filter bandwidth and/or filter stop frequency.

The scene may be characterized by multiple scanning locations and each scanning location is scanned by a laser pulse sequence. Measuring the reflected light may further include averaging individual maximum intensity peaks. And an autonomous vehicle may be operated based on the one or more objects and their corresponding distances.

DETAILED DESCRIPTION

Figure 1:
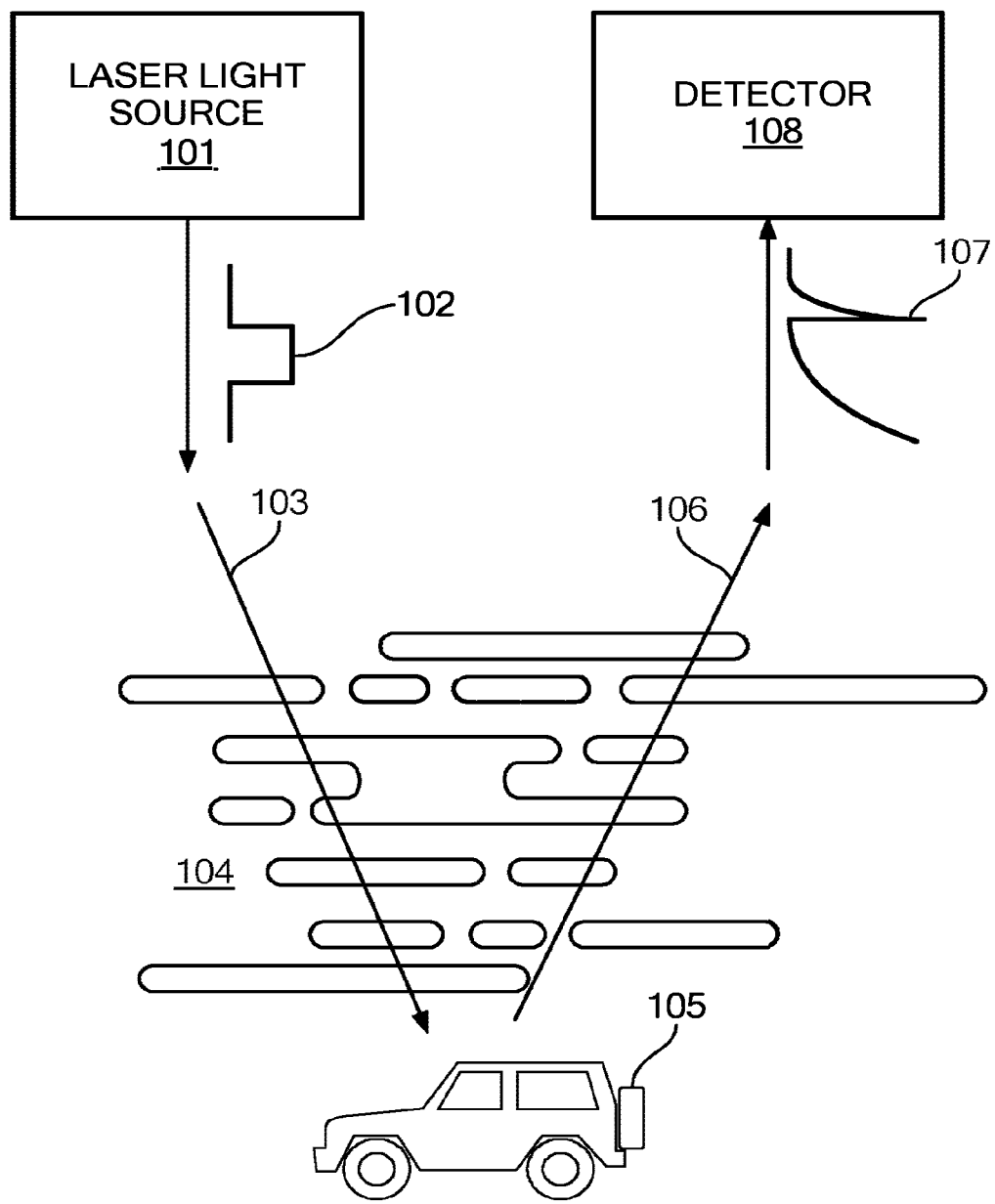
FIG. 1 shows a typical environment for embodiments of the present invention.

Embodiments of the present invention are directed to a lidar imaging system and method. FIG. 1 shows a typical environment for lidar imaging according to an embodiment of the present invention. A lidar system has a controller processor (not shown) including at least one hardware implemented processor device which is controlled by software instructions to perform the lidar imaging process. This includes instructing a laser light source 101 to pulse a location in a scene with a sequence of laser pulses 102. Each laser pulse 102 travels along a transmission path 103 to the scene, striking the various objects 105 located there. Some portion of the light in the laser pulses 102 reflects off the objects 105 and travels as reflected light 107 along a reflection path 106 and is measured by a receiver detector 108. Ideally the transmission path 103 and the reflection path 106 would be clear dry air, but in the real world there often is fog 104 and/or rain drops, smoke, sand, and other optical scatterers that can obscure the reflected light signal. The receiver detector 108 converts the received reflected light 107 into a time-resolved signal for each of the laser pulses. This is repeated N times for each scanning position of the scene by the laser light source 101. From the time resolved reflected light signals, the controller processor attempts to identify a peak signal for each location, the time of flight for which can be converted to a distance. Distance information is used to create a three dimensional image of the scene, which can be used, for example, to operate an autonomous vehicle.

Figure 2A:
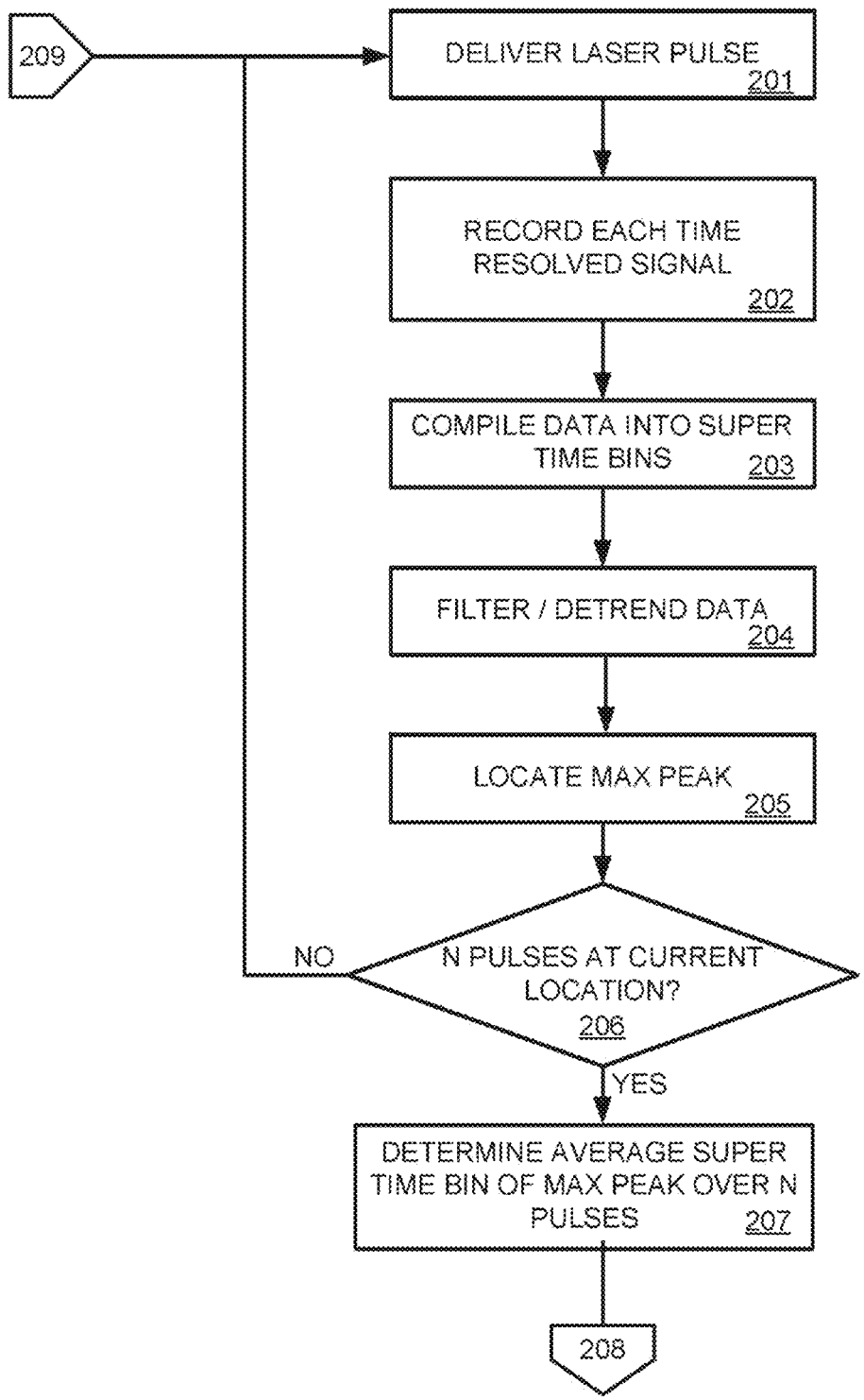
FIGS. 2A-2B show various logical steps in a method of lidar imaging according to an embodiment of the present invention.
Figure 2B:
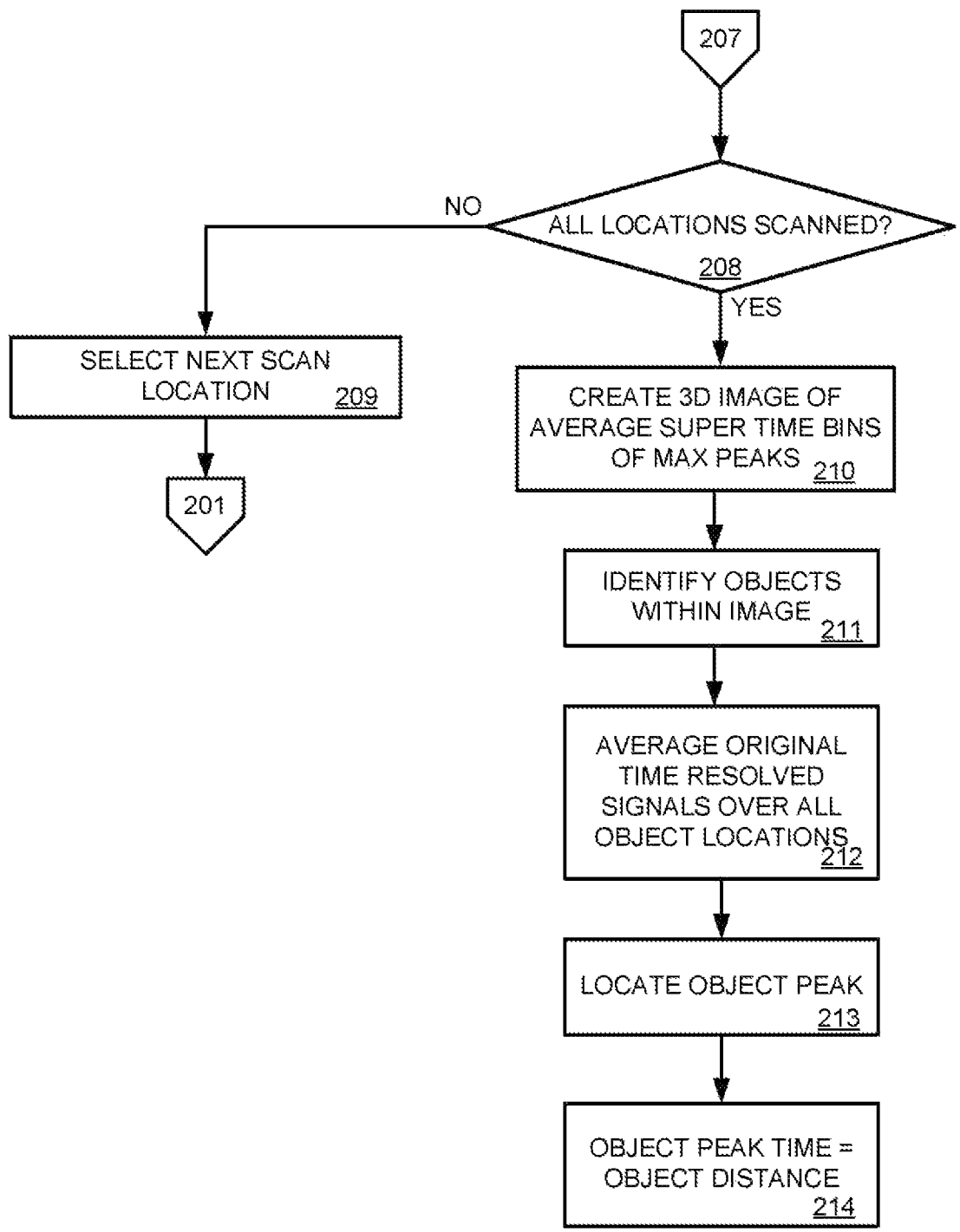
Figure 3A:
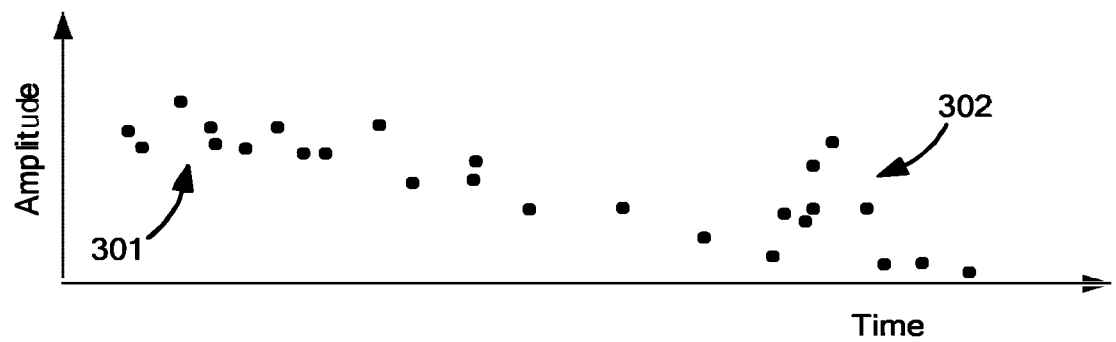
FIGS. 3A-3G show the evolution of the time resolved signal for each step of the processing.

However, scattering due to fog or other interfering factors may obscure an ability to obtain precise distances. In accordance with embodiments of the present invention, the time resolved signals may be processed as indicated in FIGS. 2A-2B. The laser light source 101 is operated to transmit a laser light pulse 102, step 201. For each light pulse, reflected light from the scene is measured to form a time resolved light signal, step 202. FIG. 3A shows the time resolved signal 301 as a graph of the number of detected photons over time. Towards the right side of FIG. 3A, a target object 302 creates a peak in the time resolved signal 301. For some embodiments, step 201 is repeated to transmit a sequence of light pulses to produce a series of reflected light detection signals as a function of time that are superimposed upon one another to form a time resolved signal, step 202. The resulting time resolved signal should have an improved signal to noise relationship due to repeated detection of reflected light from an object at a given distance and sporadic return of light from fog or other random interference. The repeated detection of light from the object reinforces the signal at the associated time along the signal. In other embodiments, such as those using a photo detector array, a time resolved signal can be generated in response to reflected light from a single light pulse. A time resolved signal has an amplitude corresponding to a number of detected photons in each of a series of sampled time bins corresponding to a sampling rate. High speed sampling permits more precise distance measurements. The smaller the time bin, the smaller the resolution of the associated distance as determined by time of flight.

Figure 3B:
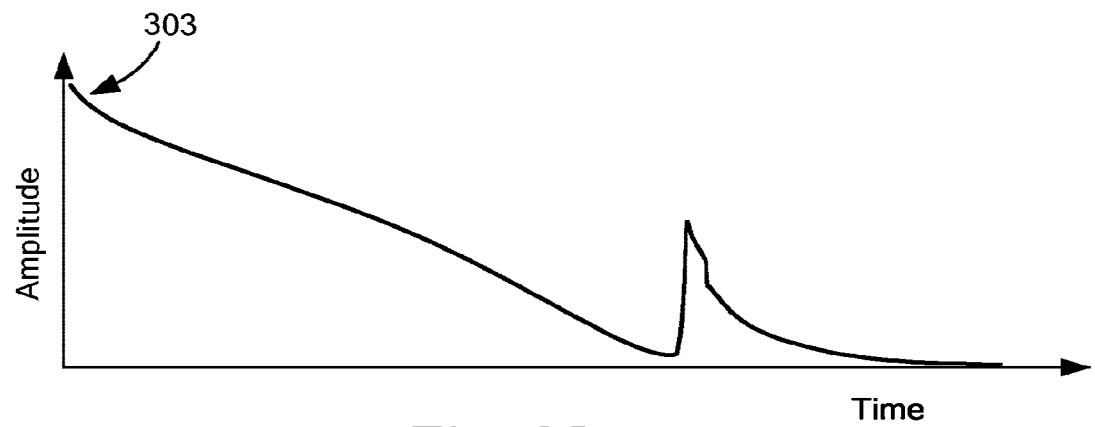

When the time resolved signals are inadequate to accurately determine distances, the method of an embodiment of the present invention can restore desired accuracy. For example, when a minimum number of photons per time bins fails to occur, then one or more adjoining time bins can be summed together to form super time bins. The larger time bins increase the signal-to-noise ratio, step 203. FIG. 3B shows the time resolved signal from FIG. 3A after "binning." The left side of the binned signal 303 has a region of increased signal magnitude due to scattering effects of fog/rain. It may also be useful to identify a maximum number of photons per time bin for each laser pulse. Increasing the size of the time bins boosts the number of photons per bin at the expense of temporal (thus spatial) resolution.

Figure 3C:
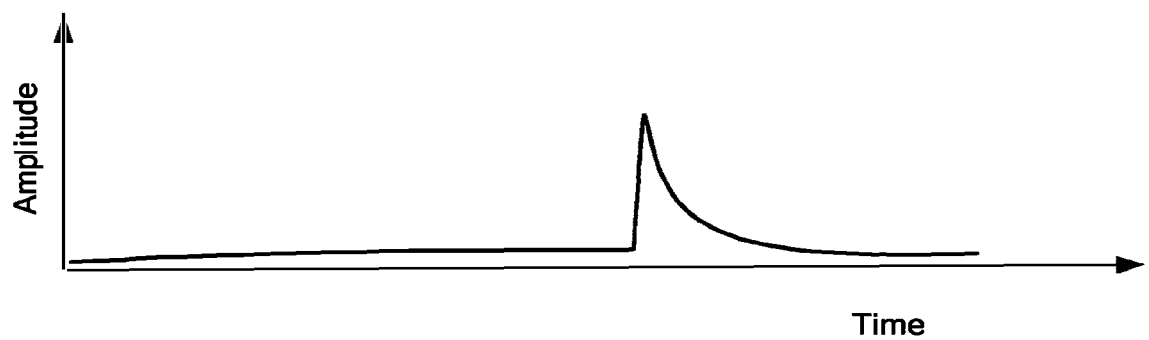
Figure 3D:
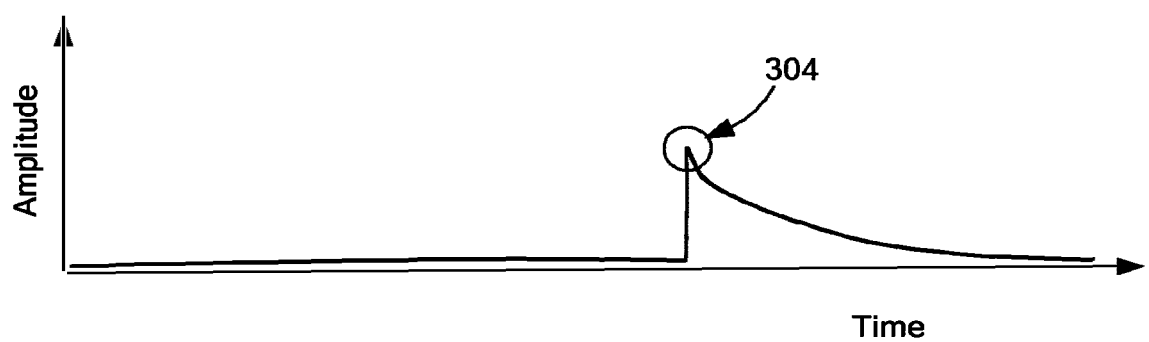

After time binning, the time resolved light signals also are filtered or detrended, step 204, for example, by high pass filtering to offset scattering effects in the measured reflected light such as from fog, rain, etc. to isolate the sharp return from the target object. As shown in FIG. 3B, the measured optical signal scattered by the fog exhibits a long, slow decay from the left side of the binned signal 303 and thus exists at lower frequencies. As can be seen in FIG. 3C, filtering/detrending the time resolved signal reduces or eliminates that decay element and helps isolate the max peak 304, step 205, FIG. 3D.

More generally, the decay of the scattered signal is directly related to the scattering properties of the atmospheric medium, and successfully dealing with adverse scattering effects can be guided by the specific scattering properties of the medium and material that is present. The correct selection of the filter properties greatly enhances the SNR of the returned signal, and so, for example, adaptively controlling the filter bandwidth and the stop frequency can optimally reduce adverse scattering from the specific atmospheric conditions at hand. Thus, an adaptive filter such as a Kalman filter could simultaneously update and inform system operation to minimize scattering based on evolving current conditions.

Figure 3E:
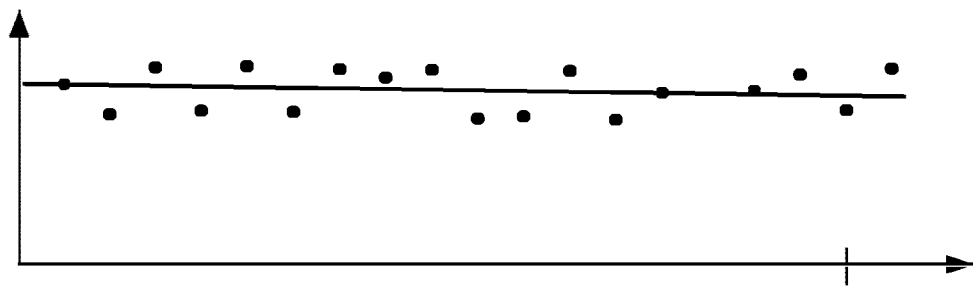

Steps 201-205 are repeated in a loop until some number N pulses have been delivered to a given scanning location, step 206. Then for the entire sequence of transmitted pulses that are delivered to a given scanning location, the super time bins at the individual max peaks in intensity are averaged, step 207, FIG. 3E. The super time bin thus determined corresponds on average to the time of flight for the maximum peak in intensity for the scanning location. If scanning has not been completed for each scanning location, step 208, then the next scanning location is selected, step 209, and the process of steps 201-208 is repeated until the entire scene has been scanned.

Figure 3F:
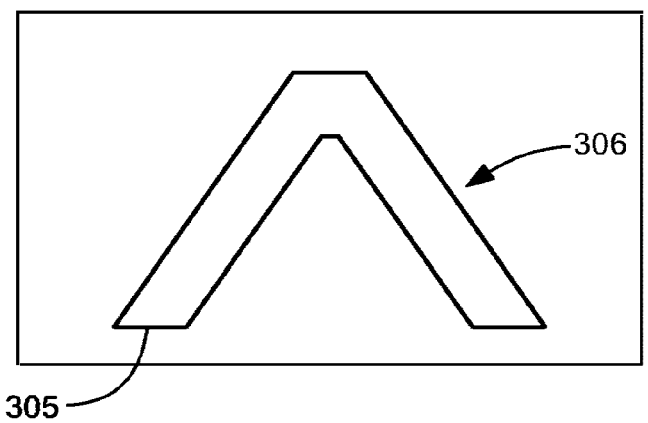
Figure 3G:
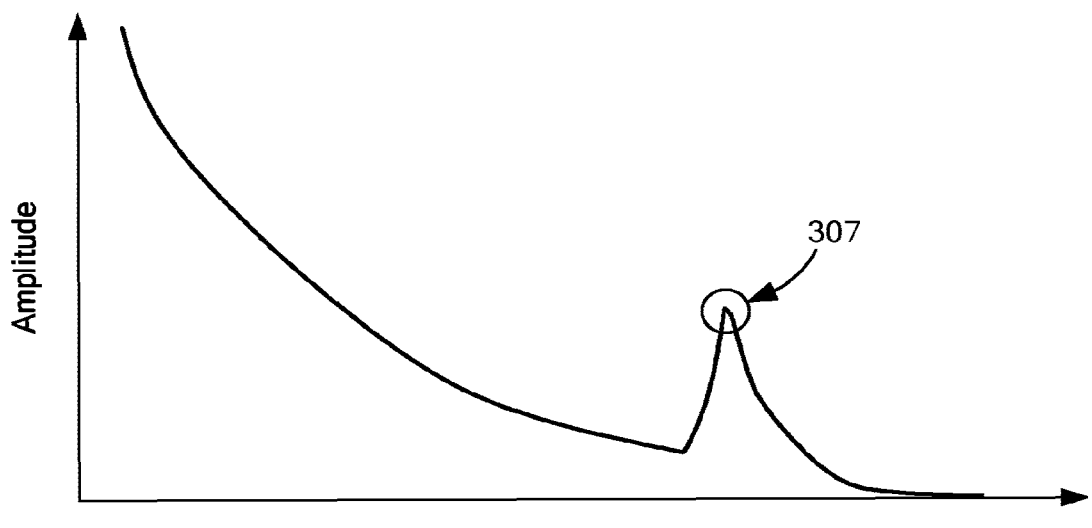

Once each location has been scanned, the averaged super time bin for maximum intensity is used to determine an approximate distance for each scan location. The determined approximate distances are used to form a single three-dimensional image 305 in FIG. 3F, step 210. Objects 306 within the image 305 are then located using an object detection algorithm. All the original time resolved signals for all the scan locations of a given object can be combined by summing or averaging as shown in FIG. 3G to locate a time peak 307 for the object that corresponds to the object's distance. It is important to note that this process can be applied to the original sized time bins of the time resolved signals to recover the high speed temporal resolution. The time bin corresponding to the maximum number of photons determines the time-of-flight of photons reflected from the object. Thus, the desired precision for object distance can be achieved.

The object distance may then be used in any of a wide variety of applications. For example, the object distance may be used in instructions that operate an autonomous vehicle.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines) and the series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A system comprising:
   at least one hardware implemented computer processor for lidar imaging configured to:
   pulse each of a plurality of scan locations in a scene with a light pulse sequence from a light source;
   measure reflected light from the scene for each light pulse to form at least one time resolved light signal for each scan location in the scene, wherein each time resolved light signal indicates a measure of received light in each of a series of time bins, wherein to measure the reflected light includes to simultaneously adaptively adjust a stop frequency of a filter for each of the time resolved light signals responsive to determining scattering effects of the measured reflected light;

responsive to a minimum number of photons in the time bins failing to be received, combine adjoining time bins to those time bins to form super time bins, wherein each super time bin indicates a measure representing a sum of the received light in the adjoining time bins;

create a three dimensional image of the scene from the measures in the super time bin;

locate one or more objects depicted in a plurality of the scan locations in the image; and for each object, combine the time resolved light signals for a plurality of the scan locations of the one or more objects to form a single object time resolved light signal for each object from which to determine distance to the object.

2. The system according to claim 1, wherein creating a three dimensional image comprises to identify a super time bin at each scan location having a maximum intensity peak.

3. The system according to claim 1, wherein to measure the reflected light includes to high-pass filter the time resolved light signals to offset scattering effects in the measured reflected light.

4. The system according to claim 1, wherein to adaptively filter includes to use a Kalman filter.

5. The system according to claim 1, wherein to adaptively filter includes to adaptively adjust filter bandwidth.

6. The system according to claim 1, wherein the program instructions further comprise to: operate an autonomous vehicle based on the determined distance to the one or more objects.

7. A non-transitory computer-program product comprising instructions for lidar imaging, that when executed by at least one hardware implemented computer processor cause the at least one hardware implemented computer processor to perform operations including to:

pulse each of a plurality of scan locations in a scene with a light pulse sequence from a light source;

measure reflected light from the scene for each light pulse to form at least one time resolved light signal for each scan location in the scene, wherein each time resolved light signal indicates a measure of received light in each of a series of time bins, wherein to measure the reflected light includes to simultaneously adaptively adjust a stop frequency of a filter for each of the time resolved light signals responsive to determining scattering effects of the measured reflected light;

responsive to a minimum number of photons in the time bins failing to be received, combine adjoining time bins to those time bins to form super time bins, wherein each super time bin indicates a measure representing a sum of the received light in the adjoining time bins;

create a three dimensional image of the scene from the measures in the super time bin;

locate one or more objects depicted in a plurality of the scan locations in the image; and for each object, combine the time resolved light signals for a plurality of the scan locations of the one or more objects to form a single object time resolved light signal for each object from which to determine distance to the object.

8. The non-transitory computer-program product according to claim 7, wherein creating a three dimensional image comprises to identify a super time bin at each scan location having a maximum intensity peak.

9. The non-transitory computer-program product according to claim 7, wherein to measure the reflected light includes to high-pass filter the time resolved light signals to offset scattering effects in the measured reflected light.

10. The non-transitory computer-program product according to claim 7, wherein to adaptively filter includes to use a Kalman filter.

11. The non-transitory computer-program product according to claim 7, wherein to adaptively filter includes to adaptively adjust filter bandwidth.

12. The non-transitory computer-program product according to claim 7, wherein the program instructions further comprise to: operate an autonomous vehicle based on the determined distance to the one or more objects.

\* \* \* \* \*